June 29, 1926.

C. ZÜBLIN 1,590,271

STERN TUBE PACKING

Filed Dec. 2, 1920

2 Sheets-Sheet 2

Witnesses:

Inventor:
Carl Züblin

Patented June 29, 1926.

1,590,271

UNITED STATES PATENT OFFICE.

CARL ZÜBLIN, OF HAMBURG, GERMANY.

STERN-TUBE PACKING.

Application filed December 2, 1920, Serial No. 427,869, and in Germany December 11, 1917.

The propeller shaft packings employed in connection with stern-tubes as constructed hitherto suffer from the drawback that they are not permanently tight whereby losses of oil are caused. The main reason is that most packings are accessible only with difficulty, so that the stuffing-box is tightened either too much or too little. These difficulties grow with the increase of the diameter of the shaft and its packings. Endeavors to obviate this drawback have not been successful because the various constructional forms designed are too complex, having, for instance, three or more tightening surfaces, an impractical arrangement of the stuffing-box, too many loose and rotating parts, and the like. Furthermore, the eccentric position of the stuffing box and of the engagement of the turning power at the rotating ring, as can be ascertained in many of those constructional forms, entails a continuous jamming of the ring whereby a permanent tightening of the packing is rendered impossible.

Experience has shown that it is difficult to tighten the packing in such a manner that the movability of the rings is not impaired thereby. The rings will, as a rule, not be able to follow sufficiently the reciprocating movement of the shaft because their elacticity is not adequate to the friction arising in the stuffing-box. The liability of the stuffing-box to get out of order is, moreover, with certain of the known constructional forms, extraordinarily great, because the weight of the ring bears upon the packing, and this latter is, furthermore, subjected to centrifugal action, in consequence whereof the packing is compressed constantly in radial direction and thereby rendered leaky. A similar state of matters arises if the tightening surfaces and the points where the springs act upon them lie so much distant from the stuffing-box that a tilting movement is produced and the rings swing around the axis whereby they are constantly pressed against the packing, and, in alternation therewith, away from it.

Figure 1:
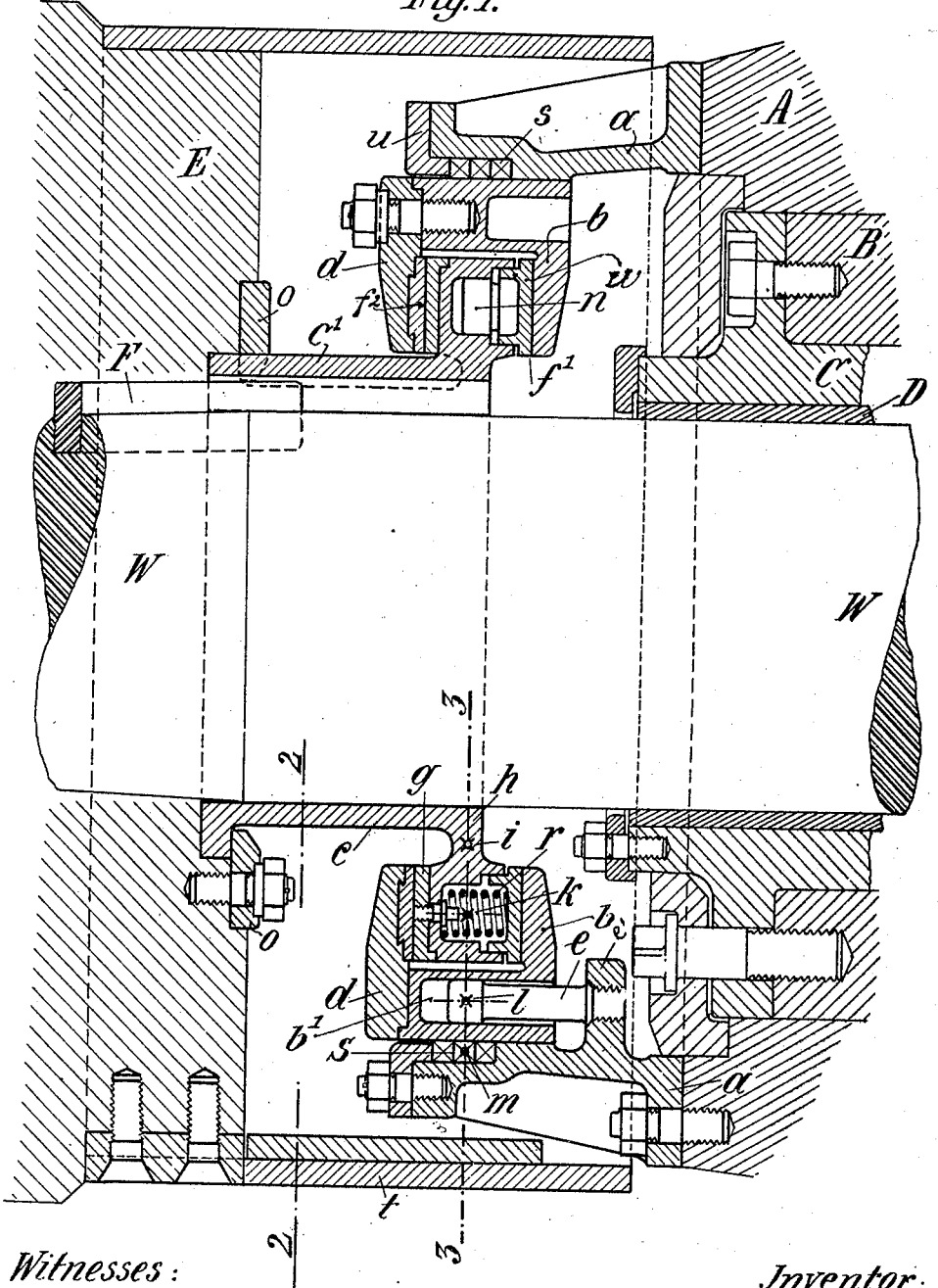
Figure 2:
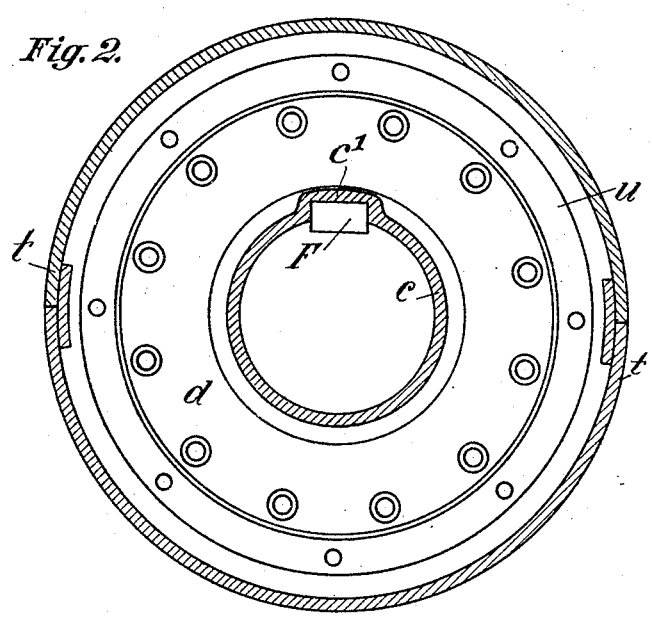

The above-mentioned drawbacks are overcome by my present invention illustrated diagrammatically and by way of example in the accompanying drawings, in which Figure 1 is a vertical longitudinal section through one constructional form of the improved stern-tube packing, the stern-tube being at the righthand side and the propeller at the lefthand side of the sheet; Figure 2 is a transverse section in the plane 2—2 of Fig. 1, seen in the direction from the propeller to the stern of the ship, and drawn on a smaller scale than Fig. 1; and Figure 3 is a transverse section in the plane 3—3 of Fig. 1, seen in the same direction as Fig. 2, and being also drawn on the small scale as this figure (2).

My improvements consist, firstly, in arranging the stuffing-box $a$ (with its gland $u$ and the packing $s$), Figure 1, at the outer side of the stern part A (which surrounds in known manner the stern parts B C D); secondly, in arranging the rings $b$ and $d$, of which $b$ is encompassed by the packing-rings $s$, concentrically with respect to the shaft W; and thirdly, in locating the central point $k$ (Fig. 1, lower half) of the direction of action of the helical spring $r$, the centre point $l$ of the bolt-carrying surface, and the centre point $i$ of the annular disk $h$, into a plane common to them all, in such a manner, that the stuffing-box $a$ need take up only the frictional shearing force of the packing. Owing to these arrangements no tilting movements that might be transferred to the gliding surface $f^1$ between the ring $b$ and the ring $w$ on the one side, and the ring $d$ and the ring $g$ on the other side, arise.

The before-mentioned disk $h$ is integral with a sleeve $c$ which surrounds the shaft W and is affixed to the hub E of the propeller by means of a ring $o$. The sleeve $c$ has at one place of its circumference a ledge-like extension $c^1$ which contains a groove receiving the feather F that connects the shaft W with the hub E.

Figure 3:
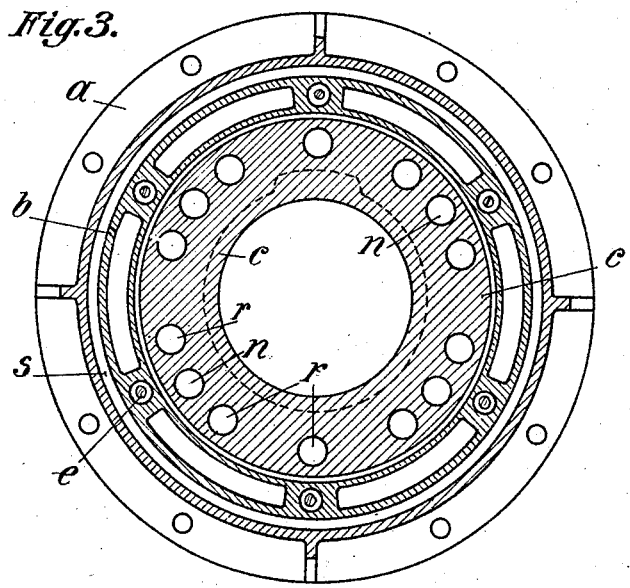

There is a plurality of helical springs, such as $r$, distributed around the periphery of the disk $h$ which is provided with bores $n$, Fig. 3, each of which encloses such a spring. These springs $r$ press the ring $w$ against the ring $b$. The ring $g$ which lies upon the opposite side of the peripheral part of the disk $h$ is affixed to this part by screws passing through the bottoms of the bores $n$, as shown in the lower part of Fig. 1.

The ring $b$ has a plurality of slots $b^1$ lying opposite to stationary bolts $e$ and receiving these bolts (see lower half of Fig. 1). The bolts $e$ project forth from internal lugs $e^1$ of the stuffing-box $a$; they prevent the rings $b$ and $d$ (which are united with each other by screws, as shown in the upper half of Fig. 1) from taking part in the rotation of the disk $h$ with its rings $g$ and $w$, but they allow of a certain axial motion of all the rings mentioned with respect to the stuffing-box $a$.

Connecting the sleeve $c$ with the propeller hub may be effected by any suitable means. The means shown in the drawing, viz, the hollow ledge-like member $c^1$ and the feather F, are merely an example which is preferred in the case where only little space is available. It is, however, important that the sleeve $c$ and the ring $h$ are not connected with the stuffing-box; this is a distinguishing feature with respect to a certain known construction.

The body of the stuffing-box, the ring $b$, and the sleeve $c$, may be bipartite in order to facilitate assembling and mounting these parts.

As, in spite of the protective mantles as employed hitherto, loose rope ends and the like may easily be caught up by the propeller and may get coiled around the propeller mantle so fast that the propeller comes to a standstill, the rotating propeller hub is, according to this device, provided with a sheet-metal drum $t$ (Fig. 1) which coils up, like a capstan, the rope ends caught up by the propeller and prevents them from doing damage because they merely rotate together with the propeller, but can not take hold at a stationary part. On the other hand, floating pieces of wood and the like are being thrown outwards by the rotating drum so that the protection offered by the rotating drum is by far greater than that offered by the known stationary mantle.

Having now described my invention, what I desire to secure by a patent of the United States is:

1. A stern-tube packing, comprising, in combination: a stuffing-box having packing therein attached to the outer side of the stern; an annular body arranged in said stuffing-box and being encompassed by said packing and having two internal flanges; means adapted to prevent said body from rotating; another annular body located between said internal flanges; and means to connect said other body with the propeller-hub, for the purpose set forth.

2. A stern-tube packing, comprising, in combination: a stuffing-box having packing therein attached to the outer side of the stern; an annular body arranged in said stuffing-box and being encompassed by said packing and having two internal flanges; means adapted to prevent said body from rotating; another annular body located between said internal flanges; and means to connect said other body with the propeller-hub; the said stuffing-box and the said two annular bodies being concentric with respect to each other, for the purpose set forth.

3. A stern-tube packing, comprising, in combination: a stuffing-box having packing therein attached to the outer side of the stern; an annular body arranged in said stuffing-box and being encompassed by said packing and having two internal flanges; means adapted to prevent said body from rotating; another annular body located between said internal flanges; and means to connect said other body with the propeller-hub; the said stuffing-box and the said two annular bodies being concentric with respect to each other and to the propeller-shaft, for the purpose set forth.

4. A stern-tube packing, comprising, in combination: a stuffing-box having packing therein attached to the outer side of the stern; an annular body arranged in said stuffing-box and being encompassed by said packing and having two internal flanges; means adapted to prevent said body from rotating; another annular body located between said internal flanges; means to connect said other body with the propeller-hub; bores in the said other annular body; helical springs located in said bores; and a ring, arranged between the free ends of said helical springs and the opposite internal flange of the first-mentioned annular body, for the purpose set forth.

5. A stern-tube packing, comprising, in combination: a stuffing-box having packing therein attached to the outer side of the stern; an annular body arranged in said stuffing-box and being encompassed by said packing and having two internal flanges; bores in said body; stationary bolts reaching into said bores; another annular body located between said internal flanges; means to connect said other body with the propeller-hub; bores in the said other annular body; helical springs located in said bores; and a ring arranged between the free ends of said springs and the opposite internal flange of the first-mentioned annular body; the arrangement of the said two annular bodies with respect to each other and to the stuffing-box being such that, first, the central point of the connecting part between the said other annular body and its fastening-means, second, the central point of the direction of action of each spring, third, the central point of the bolt-carrying surface lie all in one plane, for the purpose set forth.

6. A stern-tube packing, comprising, in combination: a stuffing-box having packing therein attached to the outer side of the stern; an annular body arranged in said stuffing-box and being encompassed by said packing and having two internal flanges; means to prevent said body from rotating; another annular body located between said internal flanges; means to connect said other body with the propeller-hub; and a protective mantle enclosing the said stuffing-box and the said two annular bodies, as set forth.

In testimony whereof I affix my signature.

CARL ZÜBLIN.